United States Patent
Aoyama et al.

(10) Patent No.: US 12,319,825 B2
(45) Date of Patent: Jun. 3, 2025

(54) INK JET INK COMPOSITION AND INK SET

(71) Applicant: Seiko Epson Corporation, Tokyo (JP)

(72) Inventors: Tetsuya Aoyama, Shiojiri (JP); Satoshi Tsubamoto, Shiojiri (JP); Masahiro Yatake, Shiojiri (JP); Tomohito Nakano, Shiojiri (JP); Tomoki Maruyama, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 590 days.

(21) Appl. No.: 17/750,513

(22) Filed: May 23, 2022

(65) Prior Publication Data

US 2022/0380616 A1  Dec. 1, 2022

(30) Foreign Application Priority Data

May 24, 2021 (JP) ................ 2021-086767

(51) Int. Cl.
| | | |
|---|---|---|
| *C09D 11/40* | (2014.01) | |
| *C09D 11/033* | (2014.01) | |
| *C09D 11/037* | (2014.01) | |
| *C09D 11/107* | (2014.01) | |
| *C09D 11/322* | (2014.01) | |
| *C09D 11/326* | (2014.01) | |
| *C09D 11/38* | (2014.01) | |

(52) U.S. Cl.
CPC ............ *C09D 11/40* (2013.01); *C09D 11/033* (2013.01); *C09D 11/037* (2013.01); *C09D 11/107* (2013.01); *C09D 11/322* (2013.01); *C09D 11/326* (2013.01); *C09D 11/38* (2013.01)

(58) Field of Classification Search
CPC ..... C09D 11/40; C09D 11/322; C09D 11/326; C09D 11/328; C09D 11/38
See application file for complete search history.

(56) References Cited

U.S. PATENT DOCUMENTS

| | | | |
|---|---|---|---|
| 7,744,205 B2 * | 6/2010 | Sarkisian ............... | C09D 11/30 347/100 |
| 2012/0098883 A1 | 4/2012 | Matsuyama et al. | |
| 2014/0036010 A1 | 2/2014 | Hasegawa et al. | |

FOREIGN PATENT DOCUMENTS

| | | | | |
|---|---|---|---|---|
| JP | 2005060411 A | * | 3/2005 | |
| JP | 2007216664 A | * | 8/2007 | ............ B41M 5/502 |
| JP | 2011-026564 A | | 2/2011 | |
| JP | 2012-214661 A | | 11/2012 | |
| JP | 2015199809 A | * | 11/2015 | ............... B41J 2/01 |
| WO | WO-2007109534 A1 | * | 9/2007 | ............ C09D 11/30 |

OTHER PUBLICATIONS

JP 2015199809 A (Nov. 12, 2015); machine translation. (Year: 2015).*

* cited by examiner

*Primary Examiner* — Rip A Lee
(74) *Attorney, Agent, or Firm* — Harness, Dickey & Pierce, P.L.C.

(57) ABSTRACT

An ink jet ink composition includes: an acetoacetanilide-based monoazo pigment coated with a water-insoluble polymer; 1-(2-hydroxyethyl)-2-pyrrolidone; and water.

8 Claims, No Drawings

INK JET INK COMPOSITION AND INK SET

The present application is based on, and claims priority from JP Application Serial Number 2021-086767, filed May 24, 2021, the disclosure of which is hereby incorporated by reference herein in its entirety.

BACKGROUND

1. Technical Field

The present disclosure relates to an ink jet ink composition and an ink set.

2. Related Art

Since being capable of forming a high quality image on a recording medium, an ink jet method has been rapidly developed in various fields. Besides development on an ink jet recording apparatus, studies to further improve ink compositions to be used therefor have also been widely carried out.

For example, since foreign materials were generated in an ink composition in some cases, a study to suppress this generation has been performed. In JP-A-2015-199809 has disclosed that in order to suppress the generation of foreign materials derived from a specific pigment in an ink, a specific monoazo dye is used in combination with the ink.

However, according to the method disclosed in JP-A-2015-199809, since elution of a causative substance to generate the foreign materials derived from the specific colorant was not suppressed, it could not be said always that the generation of the foreign materials was sufficiently suppressed.

SUMMARY

According to an aspect of the present disclosure, there is provided an ink jet ink composition comprising: an acetoacetanilide-based monoazo pigment coated with a water-insoluble polymer; 1-(2-hydroxyethyl)-2-pyrrolidone: and water.

According to another aspect of the present disclosure, there is provided an ink set comprising: the ink jet ink composition described above; a magenta ink composition containing a magenta pigment coated with a water-insoluble polymer; and a cyan ink composition containing a cyan pigment coated with a water-insoluble polymer.

DESCRIPTION OF EXEMPLARY EMBODIMENTS

Hereinafter, embodiments of the present disclosure will be described. The following embodiments are examples to describe the present disclosure. The present disclosure is not limited at all to the following embodiments and also includes various changed and/or modified embodiments within the scope of the present disclosure. In addition, all the following components are not always required to be essential components of the present disclosure.

In this specification, "(meth)acryl" indicates acryl or methacryl, and "(meth)acrylate" indicates acrylate or methacrylate.

1. Ink Jet Ink Composition

An ink jet ink composition according to this embodiment includes an acetoacetanilide-based monoazo pigment coated with a water-insoluble polymer, 1-(2-hydroxyethyl)-2-pyrrolidone, and water.

1.1. Acetoacetanilide-Based Monoazo Pigment

The ink jet ink composition of this embodiment includes an acetoacetanilide-based monoazo pigment. The acetoacetanilide-based monoazo pigment generally shows a yellow color and is relatively excellent in light resistance and solvent resistance. Examples of the acetoacetanilide-based monoazo pigment are shown in the following Table 1 in which a general formula (I) and substituents are shown.

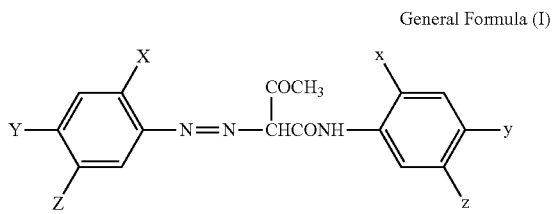

General Formula (I)

TABLE 1

| C.I. NAME | X | Y | Z | x | y | z |
|---|---|---|---|---|---|---|
| C.I. PIGMENT YELLOW 1 | $NO_2$ | $CH_3$ | H | H | H | H |
| C.I. PIGMENT YELLOW 3 | $NO_2$ | Cl | H | Cl | H | H |
| C.I. PIGMENT YELLOW 65 | $NO_2$ | $OCH_3$ | H | $OCH_3$ | H | H |
| C.I. PIGMENT YELLOW 74 | $OCH_3$ | $NO_2$ | H | $OCH_3$ | H | H |
| C.I. PIGMENT YELLOW 98 | $NO_2$ | Cl | H | $CH_3$ | Cl | H |
| C.I. PIGMENT YELLOW 97 | $OCH_3$ | $-SO_2NH-C_6H_5$ | $OCH_3$ | $OCH_3$ | Cl | $OCH_3$ |
| C.I. PIGMENT YELLOW 133 | $NO_2$ | $-SO_3-\cdot Sr\ 1/2$ | H | H | H | H |
| C.I. PIGMENT YELLOW 169 | $NO_2$ | $-SO_3-\cdot Ca\ 1/2$ | H | H | $OCH_3$ | H |

The acetoacetanilide-based monoazo pigment is synthesized, in general, such that an aromatic primary amine is diazonized and then processed by a coupling reaction with an acetoacetanilide. The present inventors have already known that in this synthesis, impurities contained in the acetoacetanilide react with a diazo compound in the system, and foreign materials are generated thereby.

Among the acetoacetanilide-based monoazo pigments mentioned above by way of example, C.I. Pigment Yellow 1 and C.I. Pigment Yellow 74 are preferable since being more excellent in color development property and light resistance. On the other hand, although C.I. Pigment Yellow 1 and C.I. Pigment Yellow 74 may generate foreign materials in some cases, in the ink jet ink composition of this embodiment, since the pigment described above is coated with a water-insoluble polymer, and in addition, since 1-(2-hydroxyethyl)-2-pyrrolidone which will be described later is also contained, the generation of the foreign materials can be sufficiently suppressed.

1.2. Water-Insoluble Polymer

The acetoacetanilide-based monoazo pigment contained in the ink jet ink composition of this embodiment is coated with a water-insoluble polymer. Although the water-insoluble polymer is not particularly limited, for example, a polymer including a basic group-containing monomer unit and a macromer unit and/or a hydrophobic monomer unit may be mentioned. In addition, the water-insoluble polymer may also include, if needed, a hydroxy group-containing monomer unit and/or another monomer unit. Hereinafter, the above units each will be described.

Basic Group-Containing Monomer

Although the basic group-containing monomer is not particularly limited, for example, a cationic monomer or an anionic monomer may be mentioned. As the examples thereof, there may be mentioned monomers disclosed from line 24 in column 7 to line 29 in column 8 on page 5 of JP-A-9-286939. In this case, although the basic group is not particularly limited, for example, a carboxy group, a sulfo group, a phosphate group, an amino group, or an ammonium group may be mentioned.

Although the cationic monomer is not particularly limited, for example, there may be mentioned an unsaturated amine-containing monomer, such as N,N-dimethylaminoethyl (meth)acrylate, N-(N',N'-dimethylaminopropyl (meth) acrylamide, or vinyl pyrrolidone, or an unsaturated ammonium salt-containing monomer.

Although the anionic monomer is not particularly limited, for example, there may be mentioned an unsaturated carboxylic acid monomer, such as acrylic acid, methacrylic acid, crotonic acid, itaconic acid, maleic acid, fumaric acid, citraconic acid, or 2-methacryloyloxymethyl succinic acid; an unsaturated sulfonic acid monomer, such as styrene sulfonic acid, 2-acrylamide-2-methylpropane sulfonic acid, 3-sulfopropyl (meth)acrylate, or bis-(3-sulfopropyl)-itaconate; or an unsaturated phosphoric acid monomer, such as vinylphosphonic acid, vinylphosphate, bis(methacryloxyethyl)phosphate, diphenyl-2-acryloyloxyethyl phosphate, diphenyl-2-methacryloyloxyethyl phosphate, or dibutyl-2-acryloyloxyethyl phosphate. Among the anionic monomers mentioned above, in view of dispersion stability and ejection stability, the unsaturated carboxylic acid monomer is preferable, and acrylic acid or methacrylic acid is more preferable.

In view of the dispersion stability of a dispersion to be obtained, a content of the basic group-containing monomer unit with respect to the total mass of the water-insoluble polymer is preferably 2 to 40 percent by mass, more preferably 2 to 30 percent by mass, and further preferably 3 to 20 percent by mass.

Macromer

Although the macromer is not particularly limited, for example, a styrene-based macromer or an aromatic group-containing (meth)acrylate-based macromer, each having a polymerizable functional group at one terminal, may be mentioned.

A number average molecular weight of the macromer is preferably 500 to 100,000 and more preferably 1,000 to 10,000. In addition, the number average molecular weight of the macromer may be measured by a gel chromatography method using a dodecyldimethylamine-containing chloroform solution at a concentration of 1 mmol/L as a solvent and a polystyrene as a reference substance.

Although the polystyrene-based macromer is not particularly limited, for example, a styrene-based monomer homopolymer or a copolymer between a styrene-based monomer and another monomer may be mentioned. As the styrene-based monomer, for example, styrene, 2-methylstyrene, vinyltoluene, ethyl vinyl benzene, vinyl naphthalene, or chlorostyrene may be mentioned.

Although the aromatic group-containing (meth)acrylate-based macromer is not particularly limited, for example, a homopolymer of an aromatic group-containing (meth)acrylate or a copolymer thereof with another monomer may be mentioned. As the aromatic group-containing (meth)acrylate, for example, there may be mentioned a (meth)acrylate having an arylalkyl group which may have a substituent containing a hetero atom and which has 7 to 22 carbon atoms, preferably 7 to 18 carbon atoms, and further preferably 7 to 12 carbon atoms or a (meth)acrylate having an aryl group which may have a substituent containing a hetero atom and which has 6 to 22 carbon atoms, preferably 6 to 18 carbon atoms, and further preferably 6 to 12 carbon atoms. As the substituent containing a hetero atom, for example, a halogen atom, an ester group, an ether group, or a hydroxy group may be mentioned. As the monomer described above, specifically, benzyl (meth)acrylate, phenoxyethyl (meth) acrylate, 2-hydroxy-3-phenoxypropyl acrylate, or 2-methacryloyloxyethyl-2-hydroxypropyl phthalate may be mentioned, and in particular, benzyl (meth)acrylate is preferable.

In addition, although the polymerizable functional group present at the one terminal of the macromer described above is not particularly limited, for example, an acryloyloxy group or a methacryloyloxy group is preferable.

As the another monomer to form a copolymer with a styrene-based monomer or an aromatic group-containing (meth)acrylate, acrylonitrile is preferable.

Although a commercially available styrene-based macromer is not particularly limited, for example, AS-6(S), AN-6(S), or HS-6(S) (trade name, manufactured by Toagosei Company, Limited) may be mentioned.

In particular, in order to enhance the interaction with a colorant, a content of the macromer unit with respect to the total mass of the water-insoluble polymer is preferably 1 to 25 percent by mass and more preferably 5 to 20 percent by mass.

Hydrophobic Monomer

Although the hydrophobic monomer is not particularly limited, for example, an alkyl (meth)acrylate or an aromatic group-containing monomer may be mentioned.

Although the alkyl (meth)acrylate is not particularly limited, for example, the number of carbon atoms of the alkyl group thereof is preferably 1 to 22 and more preferably 6 to 18, and in particular, for example, there may be mentioned methyl (meth)acrylate, ethyl (meth)acrylate, (iso)propyl (meth)acrylate, (iso or tertiary)butyl (meth)acrylate, (iso) amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, or (iso)stearyl (meth)acrylate.

As the aromatic group-containing monomer, a vinyl monomer which may have a substituent containing a hetero atom and which has an aromatic group having 6 to 22 carbon atoms or preferably 6 to 12 carbon atoms is preferable, and in particular, there may be mentioned a styrene-based monomer or an aromatic group-containing (meth)acrylate each similar to that described in the macromer. Although the substituent containing a hetero atom is not particularly limited, for example, a halogen atom, an ester group, an ether group, or a hydroxy group may be mentioned.

In view of glossiness and image clarity, a content of the hydrophobic monomer unit with respect to the total mass of the water-insoluble polymer is preferably 5 to 98 percent by mass and more preferably 10 to 60 percent by mass.

Hydroxy Group-Containing Monomer

Although the hydroxy group-containing monomer is not particularly limited, for example, there may be mentioned 2-hydroxy ethyl (meth)acrylate, 3-hydroxy propyl (meth) acrylate, a polyethylene glycol (meth)acrylate (n=2 to 30: n represents an average number of added molecules of an oxyalkylene group; hereinafter, n represents the same as described above), a polypropylene glycol (meth)acrylate (n=2 to 30), or a polyethylene glycol/propylene glycol (meth)acrylate (oxyethylene group: n=1 to 15, oxypropylene glycol: n=1 to 15). Among those mentioned above, 2-hydroxy ethyl (meth)acrylate, a polyethylene glycol monomethacrylate, or a polypropylene glycol methacrylate is preferable.

In view of the dispersion stability of the dispersion to be obtained, a content of the hydroxy group-containing monomer unit with respect to the total mass of the water-insoluble polymer is preferably 5 to 40 percent by mass and more preferably 7 to 20 percent by mass.

Another Monomer

Although another monomer is not particularly limited, for example, a compound represented by the following formula may be mentioned.

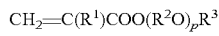

$$CH_2=C(R^1)COO(R^2O)_pR^3$$

In the above formula, $R^1$ represents a hydrogen atom or a lower alkyl group having 1 to 5 carbon atoms, $R^2$ represents a divalent hydrocarbon group which may have a hetero atom and which has 1 to 30 carbon atoms, $R^3$ represents a monovalent hydrocarbon group which may have a hetero atom and which has 1 to 30 carbon atoms, and p represents an average number of added molecules and is 1 to 60 and preferably 1 to 30.

In the above formula, as the hetero atom, for example, a nitrogen atom, an oxygen atom, a halogen atom, or a sulfur atom may be mentioned. As a preferable example of R', a methyl group, an ethyl group, or an (iso)propyl group may be mentioned. In addition, as a preferable example of $R^2O$, there may be mentioned an oxyethylene group, an oxy(iso) propylene group, an oxytetramethylene group, an oxyheptamethylene group, an oxyhexamethylene group, or an oxyalkylene group which has 2 to 7 carbon atoms and which is formed from at least two types of the oxyalkylene groups mentioned above. Furthermore, as a preferable example of $R^3$, there may be mentioned an aliphatic alkyl group having 1 to 30 carbon atoms and preferably 1 to 20 carbon atoms, an alkyl group having an aromatic ring and 7 to 30 carbon atoms, or an alkyl group having a hetero ring and 4 to 30 carbon atoms.

Although the another monomer is not particularly limited, for example, there may be mentioned a methoxypolyethylene glycol (meth)acrylate (1 to 30: this number represents the p value in the above formula; hereinafter, the number represents the same as described above), a methoxypolytetramethylene glycol (meth)acrylate (1 to 30), an ethoxypolyethylene glycol (meth)acrylate (1 to 30), an octoxypolyethylene glycol (meth)acrylate (1 to 30), a polyethylene glycol (meth)acrylate 2-ethylhexyl ether (1 to 30), an (iso)propoxypolyethylene glycol (meth)acrylate (1 to 30), a butoxypolyethylene glycol (meth)acrylate (1 to 30), a methoxypolypropylene glycol (meth)acrylate (1 to 30), or a methoxy (ethylene glycol/polypropylene glycol) (meth)acrylate (1 to 30, the number of ethylene glycols thereof: 1 to 29). Among those mentioned above, an octoxypolyethylene glycol (meth)acrylate (1 to 30) or a polyethylene glycol (meth) acrylate 2-ethylhexyl ether (1 to 30) is preferable.

As a commercially available product of the hydroxy group-containing monomer or the another monomer, for example, there may be mentioned a polyfunctional acrylate monomer (NK Ester) M-40G, 90G, or 230G (manufactured by Shin-Nakamura Chemical Co., Ltd.); or Blemmer Series PE-90, 200, or 350, PME-100, 200, 400, or 1000, PP-500, 800, or 1000, AP-150, 400, 550, or 800, 50PEP-300, or 50POEP-800B (manufactured by NOF Corporation).

In view of the dispersion stability of the dispersion to be obtained, a content of the another monomer unit with respect to the total mass of the water-insoluble polymer is preferably 5 to 50 percent by mass and more preferably 10 to 40 percent by mass.

In view of the glossiness and the image clarity, a mass ratio (the content of the basic group-containing monomer unit/(the content of the macromer unit+the content of the hydrophobic monomer unit)) of the basic group-containing monomer unit to the total of the macromer unit and the hydrophobic monomer unit is preferably 0.01 to 1, more preferably 0.02 to 0.67, and further preferably 0.03 to 0.50.

In view of the dispersion stability of the dispersion to be obtained, the total content of the basic group-containing monomer unit and the hydroxy group-containing monomer unit with respect to the total mass of the water-insoluble polymer is preferably 6 to 60 percent by mass and more preferably 10 to 50 percent by mass.

In view of the dispersion stability of the dispersion to be obtained, the total content of the basic group-containing monomer unit and the another monomer unit with respect to the total mass of the water-insoluble polymer is preferably 6 to 75 percent by mass and more preferably 13 to 50 percent by mass.

In view of the dispersion stability of the dispersion to be obtained, the total content of the basic group-containing monomer unit, the hydroxy group-containing monomer unit, and the another monomer unit with respect to the total mass of the water-insoluble polymer is preferably 6 to 60 percent by mass and more preferably 13 to 50 percent by mass.

Although a method for manufacturing the water-insoluble polymer is not particularly limited, for example, a method disclosed in JP-A-2009-172971 may be mentioned.

Since the ink composition of this embodiment contains the acetoacetanilide-based monoazo pigment coated with the water-insoluble polymer, the generation of the foreign materials is suppressed, and the print density and the glossiness of a recorded matter to be obtained are further improved. The "coated with" indicates the state in which the water-insoluble polymer is adhered to at least parts of particle surfaces of the acetoacetanilide-based monoazo pigment.

A content of the acetoacetanilide-based monoazo pigment coated with the water-insoluble polymer with respect to the total mass of the ink composition is preferably 0.5 to 12.5 percent by mass, more preferably 1.0 to 10 percent by mass, and further preferably 2.5 to 7.5 percent by mass. Since the content of the acetoacetanilide-based monoazo pigment coated with the water-insoluble polymer is 0.5 percent by mass or more, the generation of the foreign materials derived from the acetoacetanilide-based monoazo pigment coated with the water-insoluble polymer tends to be suppressed. In addition, since the content of the acetoacetanilide-based monoazo pigment coated with the water-insoluble polymer is 12.5 percent by mass or less, the print density and the glossiness of the recorded matter to be obtained tend to be further improved.

1.3.1-(2-Hydroxyethyl)-2-Pyrrolidone

The ink jet ink composition according to this embodiment contains 1-(2-hydroxyethyl)-2-pyrrolidone. 1-(2-hydroxyethyl)-2-pyrrolidone is also called N-hydroxyethyl pyrrolidone, 1-(2-hydroxyethyl)pyrrolidin-2-one, or the like (in this specification, abbreviated as "HEP" in some cases).

Since HEP is contained in the ink jet ink composition, materials derived from the acetoacetanilide-based monoazo pigment can be suppressed from being formed into the foreign materials. In addition, since HEP is contained in the ink jet ink composition, even when the materials derived from the acetoacetanilide-based monoazo pigment are formed into the foreign materials, the foreign materials can be rapidly dissolved.

Furthermore, since HEP is contained in the ink jet ink composition, an inhibitory effect of a 1,2-alkanediol or the like which is liable to inhibit dispersibility of a material in a dispersed state can be suppressed. At least one of the reasons the effect as described above is obtained is believed by the present inventors as described below. HEP has a property to appropriately adjust the relationship between a hydrophobic property and a hydrophilic property, that is, between a 1,2-alkanediol having a relatively high hydrophobic property and a water, a polyvalent alcohol, an organic solvent, or the like which have a relatively low hydrophobic property or a high hydrophilic property.

Although having an amphipathic property, HEP has not a structure in which a hydrophilic portion and a hydrophobic portion are apparently separated from each other as compared to that of a surfactant. Hence, a dispersion state of a material, such as a pigment or resin particles, dispersed in the ink jet ink composition is not likely to be unstabilized. Accordingly, among surfactants and organic solvents each having an amphipathic property, HEP also has a property which is not more likely to aggregate a material in a dispersed state in the ink jet ink composition.

A content of HEP with respect to the total mass of the ink jet ink composition is preferably 0.5 to 30.0 percent by mass, more preferably 1.0 to 20.0 percent by mass, and further preferably 2.0 to 10.0 percent by mass.

1.4. Water

The ink jet ink composition according to this embodiment contains water. As the water, for example, there may be mentioned pure water, such as ion exchange water, ultrafiltration water, reverse osmosis water, or distilled water, or water, such as ultrapure water, in which ionic impurities are reduced. In addition, in the case in which water sterilized by UV radiation or addition of hydrogen peroxide is used, when the ink jet ink composition is stored for a long time, generation of fungi and/or bacteria can be suppressed.

A content of the water with respect to the total mass of the ink jet ink composition is 30 percent by mass, preferably 40 percent by mass or more, more preferably 45 percent by mass or more, and further preferably 50 percent by mass or more. In addition, in the case in which the water is contained in the ink jet ink composition, for example, when a raw material contains water, the water contained in the ink jet ink composition includes the water contained in the raw material besides water to be intentionally added. Since the content of the water is 30 percent by mass or more, the ink jet ink composition may be made to have a relatively low viscosity. In addition, an upper limit of the content of the water with respect to the total mass of the ink jet ink composition is preferably 90 percent by mass or less, more preferably 85 percent by mass or less, and further preferably 80 percent by mass or less.

1.5. Other Components 1.5.1. Moisturizing Agent

The ink jet ink composition may further contain a moisturizing agent. When the ink jet ink composition contains a moisturizing agent, evaporation of moisture can be suppressed, and for example, storage stability can be made more preferable.

As the moisturizing agent, an alkylpolyol may be mentioned by way of example. Although the alkylpolyol conceptually includes a polyalcohol and a 1,2-alkanediol, the 1,2-alkanediol has not only a moisturizing property but also a property as a penetrant to improve penetration of the ink jet ink composition into a recording medium. When the alkylpolyol is contained, while the moisturizing property of the ink jet ink composition is further enhanced, and the ejection stability by an ink jet method is made excellent, moisture evaporation from a recording head during long-term storage can be effectively suppressed. In addition, by the alkylpolyol described above, even if a colorant which is liable to cause nozzle clogging is used, storage recovery and continuous ejection stability can be more preferably maintained.

As a concrete example of the alkylpolyol, for example, there may be mentioned 1,3-propanediol, 1,3-butanediol, 1,4-butanediol, 1,5-pentandiol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, diethylene glycol, propylene glycol, dipropylene glycol, glycerin, triethylene glycol, or tetraethylene glycol. Those alkylpolyols mentioned above may be used alone, or at least two types thereof may be used in combination.

The 1,2-alkanediol is a generic name of a compound in which the first position and the second position of the alkane are substituted by hydroxy groups. As the 1,2-alkanediol, for example, there may be mentioned ethylene glycol, propane-1,2-diol, 1,2-butanediol, 1,2-pentanediol, 1,2-hexanediol, 1,2-heptanediol, 1,2-octanediol, 1,2-nonanediol, 1,2-decanediol, 3-methyl-1,2-butanediol, 3-methyl-1,2-pentanediol, 4-methyl-1,2-pentanediol, 3,4-dimethyl-1,2-pentanediol, 3-ethyl-1,2-pentanediol, 4-ethyl-1,2-pentanediol, 3-methyl-1,2-hexanediol, 4-methyl-1,2-hexanediol, 5-methyl-1,2-hexanediol, 3,4-dimethyl-1,2-hexanediol, 3,5-dimethyl-1,2-hexanediol, 4,5-dimethyl-1,2-hexanediol, 3-ethyl-1,2-hexanediol, 4-ethyl-1,2-hexanediol, or 3-ethyl-4-methyl-1,2-hexanediol.

1.5.2. Plasticizer

The ink jet ink composition may further contain a plasticizer. In the case in which the ink jet ink composition contains a plasticizer, a flexibility of the water-insoluble polymer may be enhanced when the ink jet ink composition adhered to a recording medium is dried, and the glossiness and the print density of the recorded matter to be obtained tend to be further improved.

Although the plasticizer is not particularly limited, for example, there may be mentioned an aliphatic carboxylate ester, an aromatic carboxylate ester, a phosphate ester, a cycloalkane(alkene) carboxylate ester, an oxyacid ester, a glycol ester, an epoxy-based ester, a sulfonamide, a polyester, a glyceryl alkyl ether, a glyceryl alkyl ester, a glycol alkyl ether, a glycol alkyl ester, an ether or an ester of trimethylolpropane, or an ether or an ester of pentaerythritol. Among those mentioned above, an aliphatic carboxylate ester, such as dibutyl sebacate (sebacic acid dibutyl ester), is preferable.

A content of the plasticizer with respect to the total mass of the ink jet ink composition is preferably 0.01 to 1.0 percent by mass, more preferably 0.05 to 0.7 percent by mass, and further preferably 0.1 to 0.5 percent by mass. Since the content of the plasticizer is in the range described above, the glossiness of the recorded matter to be obtained tends to be further improved.

When the ink jet ink composition contains the plasticizer, since the water-insoluble polymer can be plasticized, a film forming property of the water-insoluble polymer adhered to a recording medium can be enhanced. Accordingly, an image having a more preferable glossiness can be formed.

1.5.3. Organic Solvent

The ink jet ink composition may contain an organic solvent other than those mentioned above. As a primary example of the organic solvent as described above, for example, a glycol ether or a cyclic amide may be mentioned.

1.5.3.1. Glycol Ether

The ink jet ink composition of this embodiment may contain a glycol ether. As the glycol ether, for example, there may be mentioned a monoalkyl ether or a dialkyl ether of a glycol selected from ethylene glycol, diethylene glycol, triethylene glycol, a polyethylene glycol, propylene glycol, dipropylene glycol, tripropylene glycol, a polypropylene glycol, and a polyoxyethylene polyoxypropylene glycol. In more particular, for example, methyl triglycol (triethylene glycol monomethyl ether), butyl triglycol (triethylene glycol monobutyl ether), butyl diglycol (diethylene glycol monomethyl ether), or dipropylene glycol monopropyl ether may be mentioned, and as a typical example, diethylene glycol monobutyl ether may be mentioned.

The ink jet ink composition may contain, among the glycol ethers, at least one selected from glycol ethers each represented by the following formula (1).

$$R^1-O-(CH_2-CH_2-O)_n-R^2 \qquad (1)$$

In the formula (1), $R^1$ represents a hydrogen atom or an alkyl group having 1 to 4 carbon atoms, $R^2$ represents an alkyl group having 1 to 4 carbon a, and n represents an integer of 2 or 3.

As the glycol ether represented by the formula (1), for example, there may be mentioned methyl triglycol (triethylene glycol monomethyl ether), butyl triglycol (triethylene glycol monobutyl ether), butyl diglycol (diethylene glycol monobutyl ether), triethylene glycol dimethyl ether, triethylene glycol dibutyl ether, or diethylene glycol dibutyl ether.

As the glycol ether, at least two types thereof may be used in combination. In addition, when the glycol ether is used, in view of viscosity adjustment of the ink jet ink composition and clogging suppression thereof by the moisturizing effect, a blend amount of the glycol ether in total with respect to the total mass of the ink jet ink composition is 0.5 to 30 percent by mass, preferably 1.0 to 20 percent by mass, and further preferably 3.0 to 10.0 percent by mass.

1.5.3.2. Cyclic Amide

The ink jet ink composition of this embodiment may contain a cyclic amide.

As the cyclic amide, a compound having a ring structure which contains an amide group may be mentioned. As the compound described above, for example, there may be mentioned a γ-lactam, such as 2-pyrrolidone, 1-methyl-2-pyrrolidone (N-methyl-2-pyrrolidone), 1-ethyl-2-pyrrolidone (N-ethyl-2-pyrrolidone), 1-propyl-2-pyrrolidone, 1-butyl-2-pyrrolidone, or N-vinyl-2-pyrrolidone (NVP); a β-lactam, a δ-lactam, or ε-lactam such as ε-caprolactam. Those cyclic amides may be used alone, or at least two types thereof may be used in combination.

1.5.3.3. Another Organic Solvent

The ink jet ink composition of this embodiment may contain another organic solvent. As the another organic solvent, for example, there may be mentioned a lactone such as γ-butyrolactone or a betaine compound may be mentioned.

A content of the organic solvent with respect to the total mass of the ink composition is preferably 0.2 to 20 percent by mass, more preferably 0.5 to 15 percent by mass, and further preferably 1.0 to 10 percent by mass.

1.5.4. Surfactant

The ink jet ink composition may contain a surfactant. Although the surfactant is not particularly limited, for example, an acetylene glycol-based surfactant, a fluorine-based surfactant, or a silicone-based surfactant may be mentioned.

Although the acetylene glycol-based surfactant is not particularly limited, for example, at least one selected from 2,4,7,9-tetramethyl-5-decyne-4,7-diol, an alkylene oxide adduct thereof, 2,4-dimethyl-5-decyne-4-ol, and an alkylene oxide adduct thereof is preferable. Although a commercially available product of the acetylene glycol-based surfactant is not particularly limited, for example, there may be mentioned Olfine 104 Series or Olfine E Series such as Olfine E1010 (trade name, manufactured by Air Products Japan, Inc.); or Surfynol 465 or Surfynol 61 (trade name, manufactured by Nisshin Chemical Industry Co., Ltd.). The acetylene glycol-based surfactant may be used alone, or at least two types thereof may be used in combination.

Although the fluorine-based surfactant is not particularly limited, for example, there may be mentioned a perfluoroalkyl sulfonate salt, a perfluoroalkyl carboxylate salt, a perfluoroalkyl phosphate ester, a perfluoroalkyl ethylene oxide adduct, a perfluoroalkyl betaine, or a perfluoroalkyl amine oxide compound. Although a commercially available product of the fluorine-based surfactant is not particularly limited, for example, there may be mentioned S-144 or S-145 (trade name, manufactured by Asahi Glass Co., Ltd.); FC-170C, FC-430, or Florade FC4430 (trade name, manufactured by Sumitomo 3M Limited); FSO, FSO-100, FSN, FSN-100, or FS-300 (trade name, manufactured by du Pont); or FT-250 or 251 (trade name, manufactured by Neos Co., Ltd.). The fluorine-based surfactant may be used alone, or at least two types thereof may be used in combination.

Although the silicone-based surfactant is not particularly limited, for example, a polysiloxane-based compound or a polyether modified organosiloxane may be mentioned. Although a commercially available product of the silicone-based surfactant is not particularly limited, in particular, for example, there may be mentioned BYK-306, BYK-307, BYK-333, BYK-341, BYK-345, BYK-346, BYK-347, BYK-348, or BYK-349 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

A content of the surfactant with respect to the total mass of the ink composition is preferably 0.10 to 1.5 percent by mass, more preferably 0.1 to 1.25 percent by mass, and further preferably 0.25 to 1.0 percent by mass. Since the content of the surfactant is in the range described above, the glossiness tends to be further improved.

1.5.5. Resin Particles

The ink jet ink composition may also contain resin particles. The resin particles are able to further improve adhesion of an image formed by the ink jet ink composition adhered to a recording medium and the like. When the ink jet ink composition further contains the resin particles, an abrasion resistance of an image to be obtained can be improved.

As the resin particles, for example, there may be mentioned resin particles formed from an urethane-based resin, an acrylic-based resin (including a styrene-acrylic-based resin), a fluorene-based resin, a polyolefin-based resin, a rosin modified resin, a terpene-based resin, a polyester-based resin, a polyamide-based resin, an epoxy-based resin, a vinyl chloride-based resin, a vinyl chloride-vinyl acetate copolymer, or an ethylene-vinyl acetate-based resin. Among those mentioned above, an urethane-based resin, an acrylic-based resin, a polyolefin-based resin, or a polyester-based resin is preferable. Although being handled in the form of an emulsion in many cases, those resin particles may also be in the form of a powder. In addition, one type of the resin particles may by used alone, or at least two types thereof may be used in combination.

The urethane-based resin is a generic name of a resin having an urethane bond. As the urethane-based resin, a polyether type urethane resin having an ether bond in its main chain besides the urethane bond, a polyester type urethane resin having an ester bond in its main chain besides the urethane bond, or a polycarbonate type urethane resin having a carbonate bond in its main chain besides the urethane bond may also be used. In addition, as the urethane-based resin, a commercially available product may also be used, and for example, there may be mentioned Superflex 460, 460s, 840, or E-4000 (trade name, manufactured by DKS Co., Ltd.); Resamine D-1060, D-2020, D-4080, D-4200, D-6300, or D-6455 (trade name, manufactured by Dainichiseika Color & Chemicals Mfg. Co., Ltd.); Takelac WS-5100, WS-6021 or W-512-A-6 (trade name, manufactured by Mitsui Chemicals Polyurethanes Inc.); Suncure 2710 (trade name, manufactured by Lubrizol); or Permarin UA-150 (trade name, manufactured by Sanyo Chemical Industries, Ltd.).

The acrylic-based resin is a generic name of a polymer obtained by polymerization using at least one acrylic-based monomer, such as (meth)acrylic acid or a (meth)acrylate ester, as one component, and for example, a resin obtained from an acrylic-based monomer or a copolymer obtained between an acrylic-based monomer and a monomer different therefrom may be mentioned. For example, an acrylic-vinyl-based resin which is a copolymer between an acrylic-based monomer and a vinyl-based monomer may be mentioned. In addition, for example, as the vinyl-based monomer, styrene or the like may be mentioned.

As the acrylic-based monomer, for example, acrylamide or acrylonitrile may also be used. As a resin emulsion formed using an acrylic-based resin as a raw material, a commercially available product may also be used, and for example, there may be used FK-854 (trade name, manufactured by Chuo Rika Kogyo Corporation); Movinyl 952B or 718A (trade name, manufactured by Nippon Synthetic Chemical Industry Co., Ltd.); or Nipol LX852 or LX874 (trade name, manufactured by Zeon Corporation).

The styrene-acrylic-based resin is a copolymer obtained from a styrene monomer and a (meth)acrylic-based monomer, and for example, there may be mentioned a styrene-acrylic acid copolymer, a styrene-methacrylic acid copolymer, a styrene-methacrylic acid-acrylate ester copolymer, a styrene-α-methyl styrene-acrylic acid copolymer, or a styrene-α-methyl styrene-acrylic acid-acrylate ester copolymer. As the styrene-acrylic-based resin, a commercially available product may also be used, and for example, there may be used Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); Movinyl 966A or 975N (trade name, manufactured by Nippon Synthetic Chemical Industry Co., Ltd.); or Vinyblan 2586 (trade name, manufactured by Nisshin Chemical Industry Co., Ltd.).

The polyolefin-based resin is a resin having a skeleton structure of an olefin, such as ethylene, propylene, or butylene, and a known resin may be appropriately used. As the polyolefin-based resin, a commercially available product may also be used, and for example, Arrowbase CB-1200 or CD-1200 (trade name, manufactured by Unitika Ltd.) may be used.

In addition, the resin particles may be supplied in the form of an emulsion, and as a commercially available product of the resin emulsion as described above, for example, there may be mentioned Microgel E-1002 or E-5002 (trade name, styrene-acrylic-based resin emulsion, manufactured by Nippon Paint Co., Ltd.); Boncoat 4001 (trade name, acrylic-based resin emulsion, manufactured by DIC Corporation); Boncoat 5454 (trade name, styrene-acrylic-based resin emulsion, manufactured by DIC Corporation); Polysol AM-710, AM-920, AM-2300, AP-4735, AT-860, or PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, or AD-70 (ethylene-vinyl acetate resin emulsion), or Polysol PSASE-6010 (ethylene-vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), or Vinylblan 5202 (acrylic acetate resin emulsion) (trade name, manufactured by Nisshin Chemical Industry Co., Ltd.); Elitel KA-5071S, KT-8803, KT-9204, KT-8701, KT-8904, or KT-0507 (trade name, polyester resin emulsion, manufactured by Unitika Ltd.); Hitech SN-2002 (trade name, polyester resin emulsion, manufactured by Toho Chemical Industry Co., Ltd.); Takelac W-6020, W-635, W-6061, W-605, W-635, or W-6021 (trade name, urethane-based resin emulsion, manufactured by Mitsui Chemicals & Polyurethanes Inc.); Superflex 870, 800, 150, 420, 460, 470, 610, or 700 (trade name, urethane-based resin emulsion, manufactured by DKS Co., Ltd.); Permarin UA-150 (urethane-based resin emulsion, manufactured by Sanyo Chemical Industries, Ltd.); Suncure 2710 (urethane-based resin emulsion, manufactured by Nippon Lubrizol); NeoRez R-9660, R-9637, or R-940 (urethane-based resin emulsion, manufactured by Kusumoto Chemicals, Ltd.); Adeka Bontigher HUX-380 or 290K (urethane-based resin emulsion, manufactured by ADEKA Corporation); Movinyl 966A or Movinyl 7320 (manufactured by Nippon Synthetic Chemical Industry Co., Ltd.); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (manufactured by BASF); NK Binder R-5HN (manufactured by Shin-Nakamura Chemical Co., Ltd.); Hydran WLS-210 (non-crosslinked polyurethane, manufactured by DIC Corporation); or Joncryl 7610 (manufactured by BASF).

When the resin particles are contained in the ink jet ink composition, a content of the resin particles as a solid content with respect to the total mass of the ink jet ink composition is 0.1 to 20 percent by mass, preferably 1 to 15 percent by mass, and more preferably 2 to 10 percent by mass.

1.5.6. Other Components

In the ink jet ink composition, there may be also contained additives, such as a chelating agent, a pH adjuster, an urea, an antiseptic agent, a fungicide, a rust inhibitor, a saccharide, an antioxidant, an UV absorber, an oxygen absorber, a solubilizing agent, and/or a viscosity adjuster each of which is generally used in an ink jet ink composition for ink jet recording. In addition, in view of safety, the ink jet ink composition of this embodiment is more preferably formed as a water-based ink composition in which a content of water is highest among those of the volatile components.

1.6. Operational Effect

According to this ink jet ink composition, since the acetoacetanilide-based monoazo pigment is coated with the water-insoluble polymer, the elution of the causative substance to generate the foreign materials is suppressed, and in addition, since 1-(2-hydroxyethyl)-2-pyrrolidone is contained, the causative substance can be suppressed from being formed into the foreign materials. As a result, even if the foreign materials are liable to be generated by a long term storage or the like, the ink jet ink composition can suppress the generation of the foreign materials. In addition, according to this ink jet ink composition, since the acetoacetanilide-based monoazo pigment is used, an image having a preferable color development property can be formed. Furthermore, according to this ink jet ink composition, since the acetoacetanilide-based monoazo pigment is coated with the water-insoluble polymer, an image having a preferable glossiness can be formed.

2. Ink Set

An ink set according to this embodiment includes the ink jet ink composition described above, a magenta ink composition containing a magenta pigment coated with a water-insoluble polymer, and a cyan ink composition containing a cyan pigment coated with a water-insoluble polymer.

2.1. Water-Insoluble Polymer

Since the water-insoluble polymer to coat the magenta pigment contained in the magenta ink composition and the water-insoluble polymer to coat the cyan pigment contained in the cyan ink composition are each similar to the water-insoluble polymer to coat the acetoacetanilide-based monoazo pigment described above, detailed description of the water-insoluble polymer will be omitted. Since each containing the pigment coated with the water-insoluble polymer, when the magenta ink composition and the cyan ink composition are adhered to a recording medium, an image having preferable color development property and glossiness is likely to be formed.

2.2. Magenta Ink Composition

The magenta ink composition contains a magenta pigment. In addition, the magenta ink composition may also contain at least another component, and for example, 1-(2-hydroxyethyl)-2-pyrrolidone and/or water may also be contained, and the materials described by way of example in the column of the above "1.5. Other Components" may also be contained. Furthermore, the contents of those materials are also similar to those described above.

As the magenta pigment, for example, C.I. Pigment Red 5, 7, 12, 48(Ca), 48(Mn), 57(Ca), 57:1, 112, 122, 123, 150, 168, 184, 202, or 209 or C.I. Pigment Violet 19 may be mentioned, and one selected from the group consisting of C.I. Pigment Red 122, 150, 202, and 209, and C.I. Pigment Violet 19 or a mixture containing at least two thereof may be mentioned by way of example.

As the pigment, a pigment dispersed in advance by a dispersant may also be used. As the dispersant, for example, there may be mentioned a (meth)acrylic-based resin, such as a poly(meth)acrylic acid, a (meth)acrylic acid-acrylonitrile copolymer, a (meth)acrylic acid-(meth)acrylate ester copolymer, a vinyl acetate-(meth)acrylate ester copolymer, a vinyl acetate-(meth)acrylic acid copolymer, or a vinyl naphthalene-(meth)acrylic acid copolymer, or its salt; a styrene-based resin, such as a styrene-(meth)acrylic acid copolymer, a styrene-(meth)acrylic acid-(meth)acrylate ester copolymer, a styrene-α-methylstyrene-(meth)acrylic acid copolymer, a styrene-α-methylstyrene-(meth)acrylic acid-(meth)acrylate ester copolymer, a styrene-maleic acid copolymer, or a styrene-maleic anhydride copolymer, or its salt; or a high molecular weight compound (resin) containing an urethane bond obtained by a reaction between an isocyanate group and a hydroxy group. As those resins mentioned above, for example, there may be mentioned a water-soluble resin, such as an urethane-based resin or its salt; a poly(vinyl alcohol); a vinyl naphthalene-maleic acid copolymer or its salt; a vinyl acetate-maleic acid ester copolymer or its salt; or a vinyl acetate-crotonic acid copolymer or its salt, each having a liner and/or a branched chain regardless of whether or not having a crosslinked structure.

As a commercially available product of the styrene-acrylic-based resin dispersant, for example, there may be mentioned X-200, X-1, X-205, X-220, or X-228 (manufactured by Seiko PMC Corporation); NOPCOSPERSE (registered trademark) 6100 or 6110 (manufactured by SAN NOPCO Limited); Joncryl 67, 586, 611, 678, 680, 682, or 819 (manufactured by BASF); DISPERBYK-190 (manufactured by BYK Japan KK); or N-EA137, N-EA157, N-EA167, N-EA177, N-EA197D, N-EA207D, or E-EN10 (manufactured by DKS Co., Ltd.).

As a commercially available product of the acrylic-based resin dispersant, for example, there may be mentioned BYK-187, BYK-190, BYK-191, BYK-194N, or BYK-199 (manufactured by BYK Japan KK); or Aron A-210, A6114, AS-1100, AS-1800, A-30SL, A-7250, or CL-2 (manufactured by Toagosei Company, Limited).

As a commercially available product of the urethane-based resin dispersant, for example, there may be mentioned BYK-182, BYK-183, BYK-184, or BYK-185 (manufactured by BYK Japan KK); TEGO Disperse 710 (manufactured by Evonic Tego Chemi); or Borchi (registered trademark) Gen 1350 (manufactured by OMG Borschers).

The dispersant may be used alone, or at least two types thereof may be used in combination. A total content of the dispersant with respect to 50 parts by mass of the pigment is preferably 0.1 to 30 parts by mass, more preferably 0.5 to 25 parts by mass, even more preferably 1 to 20 parts by mass, and further preferably 1.5 to 15 parts by mass. Since the content of the dispersant is 0.1 parts by mass or more with respect to 50 parts by mass of the pigment, dispersion stability of the pigment can be further enhanced. In addition, when the content of the dispersant is 30 parts by mass or less with respect to 50 parts by mass of the pigment, a viscosity of the dispersion to be obtained can be further decreased.

In addition, the pigment may be used as a self-dispersible pigment which is dispersed by oxidation or sulfonation of pigment surfaces with ozone, hypochlorous acid, fuming sulfuric acid, or the like.

2.3. Cyan Ink Composition

The cyan ink composition contains a cyan pigment. In addition, the cyan ink composition may also contain at least another component, and for example, 1-(2-hydroxyethyl)-2-pyrrolidone and/or water may also be contained, and the materials described by way of example in the column of the above "1.5. Other Components" may also be contained. Furthermore, the contents of those materials are also similar to those described above.

As the cyan pigment, for example, C.I. Pigment Blue 1, 2, 3, 15:3, 15:4, 15:34, 16, 22, or 60 or C.I. Vat Blue 4 or 60 may be mentioned, and one selected from the group consisting of C.I. Pigment Blue 15:3,15:4, and 60 or a mixture containing at least two thereof may be mentioned by way of example.

The use of the pigment dispersant, the formation of the self-dispersible pigment, and the like are the same as those described in the above magenta ink composition.

2.4. Other Ink Compositions

The ink set of this embodiment may include a plurality of the above ink jet ink compositions, a plurality of the above magenta ink compositions, and a plurality of the above cyan ink compositions. Furthermore, the ink set of this embodiment may also include at least one ink composition other than the ink jet ink composition, the magenta ink composition, and the cyan ink composition described above. As an example of the ink composition described above, at least one ink composition having a black color, a blue color, a red color, an orange color, a white color, a fluorescent color, or a bright color may be included. Among those mentioned above, hereinafter, a black ink composition will be described.

The ink set of this embodiment may include a black ink composition. The black ink composition contains a black pigment. In addition, the black ink composition may also contain at least another component, and for example, 1-(2-hydroxyethyl)-2-pyrrolidone and/or water may be contained, and the materials described by way of example in the above "1.5. Other Components" may also be contained. Furthermore, the contents of those materials are similar to those described above.

Furthermore, the black pigment contained in the black ink composition may also be coated with a water-insoluble polymer.

As the black pigment, for example, there may be used a carbon black (C.I. Pigment Black 7 or the like), such as a furnace black, a lamp black, an acetylene black, or a channel black, or an iron oxide.

As the carbon black, for example, No. 2300, 900, MCF88, No. 20B, No. 33, No. 40, No. 45, No. 52, MA7, MA8, MA100, or No. 2200B (manufactured by Mitsubishi chemical Co., Ltd.) may be mentioned. In addition, as the carbon black, Color Black FW1, FW2, FW2V, FW18, FW200, 5150, 5160, or 5170, Pretex 35, U, V, or 140U, or Special Black 6, 5, 4A, 4, or 250 (manufactured by Degussa AG.) may be mentioned by way of example. In addition, as the carbon black, for example, Conductex SC, or Raben 1255, 5750, 5250, 5000, 3500, 1255, or 700 (manufactured by Columbia Carbon Inc.) may also be mentioned. In addition, as the carbon black, for example, Regal 400R, 330R, or 660R, Mogul L, Monarch 700, 800, 880, 900, 1000, 1100, 1300, or 1400, or Elftex 12 (manufactured by Cabot Corporation) may also be mentioned. Furthermore, as the carbon black, for example, BONJET BLACK CW-1, CW-1S, CW-2, CW-3, or M-800 (manufactured by Orient Chemical Industries Co., Ltd.) may also be mentioned.

The use of the pigment dispersant, the formation of the self-dispersible pigment, and the like are the same as those described in the above magenta ink composition. Since the black pigment functioning as the self-dispersible pigment is contained in the black ink composition, a solid content concentration of the pigment can be increased, and hence, a black color development property can be enhanced.

The black ink composition may contain a (meth)acrylic resin having a glass transition temperature of 20° C. or less. As an example of the (meth)acrylic resin having a glass transition temperature of 20° C. or less, among the resin particles described above, a resin having a glass transition temperature of 20° C. or less may be mentioned. Accordingly, since a flexibility of the (meth)acrylic resin is preferable, and the film formation can be more easily performed when the black ink composition is adhered to a recording medium, an image having a more preferable fixing property can be formed. In addition, the glass transition temperature (Tg) of the resin can be measured by a usual method using a differential scanning calorimeter (DSC).

2.5. States of Ink Compositions Included in Ink Set

As described above, besides the ink jet ink composition, the magenta ink composition, and the cyan ink composition described above, the ink set of this embodiment may also arbitrarily include at least one ink composition having a black color, a blue color, a red color, an orange color, a white color, a fluorescent color, or a bright color, and the numbers of the compositions described above each may be appropriately determined. Among the ink compositions described above, as is the case of the ink jet ink composition, the magenta ink composition, the cyan ink composition, and the at least one ink composition having a black color, a blue color, a red color, an orange color, a white color, a fluorescent color, or a bright color each also preferably contain 1-(2-hydroxyethyl)-2-pyrrolidone. That is, the ink jet ink composition and at least one ink composition other than the ink jet ink composition more preferably contain 1-(2-hydroxyethyl)-2-pyrrolidone.

Since the ink set as described above is formed, the ink composition other than the ink jet ink composition can be further suppressed from generating foreign materials in a waste liquid discharged by flushing or the like.

2.6. Operational Effect

According to this ink set, even if the foreign materials are liable to be generated by a long term storage or the like, the generation of the foreign materials can be suppressed at least in the ink jet ink composition.

3. Examples and Comparative Examples

Hereinafter, although the present disclosure will be described in detail, the present disclosure is not limited to the following Examples. Hereinafter, "part(s)" and "%" are on a mass basis unless otherwise particularly noted.

3.1. Manufacturing of Pigment Dispersion

The following dispersions were manufactured.

Water dispersion I: water dispersion of C.I. Pigment Yellow 74 coated with water-insoluble polymer (see the following Manufacturing Example 1, solid content concentration: 20 percent by mass)

Water dispersion II: water dispersion of C.I. Pigment Yellow 1 coated with water-insoluble polymer (see the following Manufacturing Example 2, solid content concentration: 20 percent by mass)

Water dispersion III: water dispersion of C.I. Pigment Yellow 74 not coated with water-insoluble polymer (solid content concentration: 20 percent by mass)

Manufacturing Example of Water-Insoluble Polymer

After 20 parts of methyl ethyl ketone, 0.03 parts of a polymerization chain transfer agent (2-mercaptoethanol), and 10 percent by mass of 200 parts of the total of the following monomers were charged and mixed together in a reaction chamber, a nitrogen gas purge was sufficiently performed, so that a mixed solution was obtained. In addition, the unit of the numerical value of each monomer is percent by mass, and the total is 100.0 percent by mass.

| | |
|---|---|
| Methacrylic acid | 11 |
| Styrene macromer | 10 |
| Styrene | 39 |
| Benzyl methacrylate | 10 |
| PP-800 | 30 |

In this case, the individual materials are as described below.
Styrene macromer (manufactured by Toagosei Company, Limited, trade name: AS-6(S), number average molecular weight: 6,000, polymerizable functional group: methacryloyloxy group)
PP-800 (polypropylene glycol monomethacrylate (average number of added propylene oxide moles: 13, terminal: hydroxy group), manufactured by NOF Corporation, trade name: Blemmer PP-800)

In addition, after remaining 90 percent by mass of the mixture containing the individual monomers described above was charged in a dripping funnel, 0.27 parts of the above polymerization chain transfer agent, 60 parts of methyl ethyl ketone, and 1.2 parts of a radical polymerization initiator (2,2'-azobis(2,4-dimethylvaleronitrile)) were charged and mixed together, and nitrogen gas purge was sufficiently performed, so that a mixed solution was obtained.

While the mixed solution in the reaction chamber was stirred in a nitrogen atmosphere, the temperature was increased to 65° C., and the mixed solution in the dripping funnel was gradually dripped over 3 hours. After the dripping was completed, a mixture thus obtained was maintained at 65° C. for 2 hours, and a solution in which 0.3 parts of the above radical polymerization initiator was dissolved in 5 parts of methyl ethyl ketone was then added to the mixture described above. Subsequently, aging at 65° C. for 2 hours and aging at 70° C. for 2 hours were further performed, so that a polymer solution was obtained. A weight average molecular weight of the polymer thus obtained was 150,000.

Manufacturing Example 1 of Water Dispersion

After 30 parts of a polymer obtained from the solution of the water-insoluble polymer prepared in the above Manufacturing Example by reduced-pressure drying was dissolved in 70 parts of methyl ethyl ketone, a neutralizer (5N sodium hydroxide aqueous solution) in an amount to have a neutralization degree of 60% and 230 parts of ion exchange water were added to neutralize the basic group, and 65 parts of an acetoacetanilide-based monoazo pigment (C.I. Pigment Yellow 74, manufactured by Sanyo Color Works, Ltd., trade name: FY7413) functioning as a yellow pigment was further added, followed by mixing for one hour at 20° C. by a dispersing blade. A mixture thus obtained was processed by a 10-pass dispersion treatment at a pressure of 200 MPa using a microfluidizer (trade name, manufactured by Microfluidics).

After 250 parts of ion exchange water was added to a dispersion liquid thus obtained and then stirred, methyl ethyl ketone was removed at 60° C. at a reduced pressure, and the water was further partially removed. Subsequently, filtration was performed by a 25-mL needless syringe provided with a 5-μm filter (acetyl cellulose membrane, outside diameter: 2.5 cm, manufactured by Fuji Photo Film Co., Ltd.) to remove coarse particles, so that a water dispersion I which contained C.I. Pigment Yellow 74 coated with the water-insoluble polymer and which had a solid content concentration of 20 percent by mass was obtained.

Manufacturing Example 2 of Water Dispersion

Except for that C.I. Pigment Yellow 1 was used, by a method similar to that of Manufacturing Example 1, a water dispersion II which contained C.I. Pigment Yellow 1 coated with the water-insoluble polymer and which had a solid content concentration of 20 percent by mass was obtained.

Manufacturing Example 3 of Water Dispersion

A 4-L stainless steel-made beaker was fitted to a rotor-stator type high shear mixing machine (manufactured by Silverson, trade name: "L4RT-a") and was then immersed in an ice bath. After approximately 75 g of C.I. Pigment Yellow 74 and 1,000 g of water were charged in this beaker, a mixture thus prepared was homogenized at 7,200 rpm for 15 minutes. Subsequently, 20 mL of an isopropyl alcohol solution in which 2.07 g (0.01 mol) of o-acetanisidide was dissolved was added to the mixture described above, and stirring was further performed for 15 minutes.

In a separate container, 4.35 g (0.025 mol) of sulfanilic acid, 30 ml of 1N—HCl, and 1.73 g (0.025 mol) of sodium nitrite were mixed together, so that a diazonium salt was formed. Subsequently, this salt was added to the mixture of C.I. Pigment Yellow 74 and o-acetanisidide while stirring was performed, and the temperature was maintained at approximately 10° C. This mixture was adjusted to have a pH of 5 to 6 by dripping of a 5M-sodium hydroxide solution, and while the progress of the reaction was monitored by the presence or absence of the diazonium salt, stirring was further performed for 2 hours.

After the mixture was transferred to a Telsonic flow-type sonic treatment device and then processed by an ultrasonic treatment for 2 hours, a pigment dispersion liquid thus obtained was refined using a 50-nm diameter filtration membrane column and then condensed to have a solid content concentration of 20%, so that a water dispersion III of C.I. Pigment Yellow 74 not coated with the water-insoluble polymer was obtained.

3.2. Preparation of Ink Jet Ink Composition

Individual materials were mixed together to have compositions shown in the following Table 2 and then sufficiently stirred, so that individual ink compositions were obtained. In particular, the individual materials were uniformly mixed together, and insoluble matters were removed using a filter, so that the individual ink compositions were prepared. In addition, in the table, the unit of the numerical value is percent by mass, and the total is 100.0 percent by mass.

TABLE 2

|  | EXAMPLE | | | | | | | COMPARATIVE EXAMPLE | | |
| --- | --- | --- | --- | --- | --- | --- | --- | --- | --- | --- |
|  | 1 | 2 | 3 | 4 | 5 | 6 | 7 | 1 | 2 | 3 |
| WATER DISPERSION I | 5.0 | 5.0 | — | 5.0 | 5.0 | 5.0 | 5.0 | 5.0 | 5.0 | — |
| WATER DISPERSION II | — | — | 5.0 | — | — | — | — | — | — | — |
| WATER DISPERSION III | — | — | — | — | — | 0.03 | — | — | 0.03 | 5.0 |
| DBS | 0.2 | 0.2 | 0.2 | 0.2 | 0.2 | 0.2 | — | 0.2 | 0.2 | 0.2 |
| HEP | 1.0 | 3.0 | 3.0 | 5.0 | 8.0 | 3.0 | 3.0 | — | — | 3.0 |
| TEGmBE | 1.0 | 1.0 | 1.0 | 1.0 | 1.0 | 1.0 | 1.0 | 1.0 | 1.0 | 1.0 |
| Gly | 10.0 | 10.0 | 10.0 | 10.0 | 10.0 | 10.0 | 10.0 | 10.0 | 10.0 | 10.0 |
| TEG | 5.0 | 5.0 | 5.0 | 5.0 | 5.0 | 5.0 | 5.0 | 5.0 | 5.0 | 5.0 |
| E1010 | 0.5 | 0.5 | 0.5 | 0.5 | 0.5 | 0.5 | 0.5 | 0.5 | 0.5 | 0.5 |
| PURE WATER | BALANCE | BALANCE | BALANCE | BALANCE | BALANCE | BALANCE | BALANCE | BALANCE | BALANCE | BALANCE |
| TOTAL | 100 | 100 | 100 | 100 | 100 | 100 | 100 | 100 | 100 | 100 |
| REGULAR PAPER OD | A | A | A | A | A | A | A | A | A | A |
| PGPP GLOSSINESS | A | A | A | A | A | B | B | A | B | C |
| INK FLOW TEST | B | B | B | A | A | A | A | E | C | D |

The abbreviations in Table 2 are as shown below.
DBS: dibutyl sebacate (plasticizer)
HEP: 1-(2-hydroxyethyl)-2-pyrrolidone
TEGmBE: triethylene glycol monobutyl ether
Gly: glycerin (moisturizing agent)
TEG: triethylene glycol (moisturizing agent)
E1010: Olfine E1010 (acetylene glycol-based surfactant, manufactured by Nisshin Chemical Industry Co., Ltd.)
* The content of the colorant represents a solid content.

3.3. Examples 1 to 7 and Comparative Examples 1 to 3

3.3.1. Evaluation of OD (Optical Density) on Regular Paper

After the ink jet ink composition shown in Table 2 was filled in an ink jet printer PX-B700 (manufactured by Seiko Epson Corporation), a patch pattern at a duty of 100% was printed on a recording medium by a "regular paper/clear" mode, so that a recorded matter was obtained. In addition, as the recording medium, Xerox P paper (manufactured by Fuji Xerox), one type of regular paper, was used. An optical density value (OD value) of a patch portion of the recorded matter thus obtained was measured by a Gretag densitometer (manufactured by Gretag Macbeth Corp.) and then evaluated by the following evaluation criteria. The results are shown in Table 2.

Evaluation Criteria
A: OD value is 1.1 or more.
B: OD value is less than 1.1.

3.3.2. PGPP Glossiness (Glossiness)

After the ink composition shown in Table 2 was filled in an ink jet printer PX-B700 (manufactured by Seiko Epson Corporation), a patch pattern at a duty of 100% was printed on a recording medium by a "glossy paper/standard" mode, so that a recorded matter was obtained. In addition, as the recording medium, EPSON Photo Grade Paper<Gloss> (manufactured by Seiko Epson Corporation), one type of glossy paper, was used. A glossiness at 60° of the recorded matter thus obtained was measured by a gloss meter MULTI Gloss 268 (manufactured by Konica Minolta, Inc.) and was then evaluated by the following evaluation criteria. The results are shown in Table 2.

Evaluation Criteria
A: Glossiness is 30 or more.
B: Glossiness is 20 to less than 30.
C: Glossiness is less than 20.

3.3.3. Ink Flow Test

After 100 ml of the ink composition shown in Table 2 was filled in cartridges ICY90L for an ink jet printer PX-B700 (manufactured by Seiko Epson Corporation), the cartridges were left at ordinary temperature (25° C.) for 6 months and 12 months. Subsequently, after being taken out of the cartridge, the ink composition was totally filtrated using an MF-Millipore Membrane Filter (SS 3 μm, diameter: 49 mm), and filter paper used for this filtration was observed by an optical microscope (magnification: 300 times). Evaluation Criteria A: No foreign materials are observed from the ink compositions left for 6 months and 12 months.
B: No foreign materials are observed from the ink composition left for 6 months, and even from the ink composition left for 12 months, less than one tenth of the filter surface is only covered.
C: No foreign materials are observed from the ink composition left for 6 months, but when the ink composition is left for 12 months, one tenth or more of the filter surface is covered.
D: Foreign materials are observed from the ink composition left for 6 months, and less than one tenth of the filter surface is covered.
E: Foreign materials are observed from the ink composition left for 6 months, and one tenth or more of the filter surface is covered.

3.4. Manufacturing of Magenta Ink Composition, Cyan Ink Composition, and Black Ink Composition Individual materials were mixed together to have the compositions shown in the following Table 3 and then sufficiently stirred, so that individual ink compositions were obtained. In particular, the individual materials were uniformly mixed together, and insoluble matters were removed using a filter, so that the individual ink compositions were prepared. In addition, in the table, the unit of the numerical value is percent by mass, and the total is 100.0 percent by mass.

Preparation of Self-Dispersible Type CB Dispersion Liquid

After 20 g of S170 (trade name, manufactured by Degussa) which was a commercially available carbon black

TABLE 3

|  | Y1 | M1 | M2 | C1 | Y3 | M3 | C3 | K1 | K2 |
|---|---|---|---|---|---|---|---|---|---|
| WATER DISPERSION I (PY74 COVERED WITH WATER-INSOLUBLE POLYMER) | 5.0 | — | — | — | 5.0 | — | — | — | — |
| PV19 COVERED WITH WATER-INSOLUBLE POLYMER | — | 5.0 | — | — | — | 5.0 | — | — | — |
| PR122 COVERED WITH WATER-INSOLUBLE POLYMER | — | — | 5.0 | — | — | — | — | — | — |
| PB15:4 COVERED WITH WATER-INSOLUBLE POLYMER | — | — | — | 5.0 | — | — | 5.0 | — | — |
| DBS | 0.2 | 0.2 | 0.2 | 0.2 | 0.2 | 0.2 | 0.2 | — | — |
| SELF-DISPERSIBLE PIGMENT CB | — | — | — | — | — | — | — | 8.0 | 8.0 |
| ST-AC RESIN (Tg15° C.) | — | — | — | — | — | — | — | 2.0 | 2.0 |
| HEP | 1.0 | 1.0 | 1.0 | 1.0 | — | — | — | — | 2.0 |
| TEGmBE | 1.0 | 1.0 | 1.0 | 1.0 | 1.0 | 1.0 | 1.0 | 2.0 | 2.0 |
| Gly | 10.0 | 10.0 | 10.0 | 10.0 | 10.0 | 10.0 | 10.0 | 5.0 | 5.0 |
| TEG | 5.0 | 5.0 | 5.0 | 5.0 | 5.0 | 5.0 | 5.0 | 2.0 | 2.0 |
| E1010 | 0.5 | 0.5 | 0.5 | 0.5 | 0.5 | 0.5 | 0.5 | 0.5 | 0.5 |
| PURE WATER | BALANCE | BALANCE | BALANCE | BALANCE | BALANCE | BALANCE | BALANCE | BALANCE | BALANCE |
| TOTAL | 100 | 100 | 100 | 100 | 100 | 100 | 100 | 100 | 100 |

In Table 3, Y1 and Y3 each indicate a yellow ink composition (ink jet ink composition), M1, M2, and M3 each indicate a magenta ink composition, and C1 and C3 each indicate a cyan ink composition. In addition, a water dispersion I is the water dispersion I obtained in the above "Manufacturing Example 1 of Water Dispersion".

Except for that C.I. Pigment violet 19 was used, PV19 coated with the water-insoluble polymer was obtained by a method similar to that of Manufacturing Example 1, and the PV19 was a water dispersion which contained C.I. Pigment Violet 19 coated with the water-insoluble polymer and which had a solid content concentration of 20 percent by mass.

Except for that C.I. Pigment Red 122 was used, PR122 coated with the water-insoluble polymer was obtained by a method similar to that of Manufacturing Example 1, and the PR122 was a water dispersion which contained C.I. Pigment Red 122 coated with the water-insoluble polymer and which had a solid content concentration of 20 percent by mass.

Except for that C.I. Pigment Blue 15:4 was used, PB15:4 coated with the water-insoluble polymer was obtained by a method similar to that of Manufacturing Example 1, and the PB15:4 was a water dispersion which contained C.I. Pigment Blue 15:4 coated with the water-insoluble polymer and which had a solid content concentration of 20 percent by mass.

was mixed with 500 g of water, a mixture thus prepared was dispersed for 5 minutes by a household mixer. After a liquid thus obtained was charged in a 3-L glass container equipped with a stirring device, while stirring was performed by the stirring device, an ozone-containing gas at an ozone concentration of 8 percent by weight was introduced at a rate of 500 cc/min. In this step, ozone was generated using an electrolytic type ozonizer (manufactured by Pelmelec Electrode Ltd.) as an ozone generator. A dispersion stock solution thus obtained was filtrated using glass fiber filter paper GA-100 (trade name, manufactured by Advantec Toyo Kaisha, Ltd.) and was further condensed to have a pigment concentration of 15 percent by weight while a pH of 9 was controlled by addition of a 0.1N-potassium hydroxide solution, so that a dispersion liquid was prepared.

Preparation of St-Ac Resin

After 900 g of ion exchange water and 3 g of sodium lauryl sulfate were charged in a reaction chamber equipped with a stirring device, a reflux condenser, a dripping device, and a thermometer, the temperature of a mixture thus prepared was increased to 70° C. with stirring while a nitrogen purge was performed. While an inside temperature was maintained at 70° C., after 4 g of potassium persulfate was added as a polymerization initiator to the mixture described above and was dissolved therein, an emulsion formed in advance by adding 20 g of acrylamide, 300 g of styrene, 640 g of butyl acrylate, and 30 g of methacrylic acid to 450 g of ion exchange water and 3 g of sodium lauryl sulfate was continuously dripped in the reaction chamber over 4 hours. After the dripping was completed, aging was performed for 3 hours. After an aqueous emulsion thus obtained was cooled to ordinary temperature, ion exchange water and 5%-sodium hydroxide aqueous solution were added for adjustment so as to have a solid content of 30 percent by weight and a pH of 8. A glass transition temperature (Tg) of a St-Ac resin was 15° C. by measurement using a known DSC method.

The other abbreviations are the same as those shown in Table 2.

3.5. Evaluation of Ink Set 3.5.1. PGPP Glossiness (YMC Image)

Among the ink compositions shown in Table 4, the ink compositions of Y (yellow), M (magenta), and C (cyan) were filled in an ink jet printer PX-B700 (manufactured by Seiko Epson Corporation), and a patch pattern at a duty of 100% was printed on a recording medium by a "glossy paper/standard" mode, so that a recorded matter was obtained. As the recording medium, EPSON photo grade paper<gloss> (manufactured by Seiko Epson Corporation), one type of glossy paper, was used. A glossiness at 60° of the recorded matter thus obtained was measured by a gloss meter MULTI Gloss 268 (manufactured by Konica Minolta, Inc.) and was then evaluated by the following evaluation criteria. The results are shown in Table 4.

Evaluation Criteria

TABLE 4

A: Glossiness is 30 or more.
B: Glossiness is 20 to less than 30.
C: Glossiness is less than 20.

|  | EXAMPLE 8 | EXAMPLE 9 | EXAMPLE 10 | EXAMPLE 11 | COMPARATIVE EXAMPLE 4 |
|---|---|---|---|---|---|
| Y | Y1 | Y1 | Y1 | Y1 | Y3 |
| M | M2 | M1 | M1 | M3 | M3 |
| C | C1 | C1 | C3 | C3 | C3 |
| K | K2 | K1 | K1 | K1 | K1 |
| PGPP GLOSSINESS (YMC IMAGE) | A | A | B | B | C |
| INK FLOW TEST (FOREIGN MATERIALS FROM Y) | A | A | A | B | E |

3.5.2. Ink Flow Test

After 100 ml of a mixed liquid in which four colors, Y (yellow), M (magenta), C (cyan), and K (black), shown in Table 4 selected from the ink compositions shown in Table 3 were mixed together at a weight ratio of 1:1:1:1 was filled in cartridges ICY90L for an ink jet printer PX-B700 (manufactured by Seiko Epson Corporation), the cartridges were left at ordinary temperature (25° C.) for 6 months and 12 months.

Subsequently, after being taken out of the cartridge, the ink composition was totally filtrated using an MF-Millipore Membrane Filter (SS 3 μm, diameter: 49 mm), and filter paper used for this filtration was observed by an optical microscope (magnification: 300 times).

Evaluation Criteria
A: No foreign materials are observed from the ink compositions left for 6 months and 12 months.
B: No foreign materials are observed from the ink composition left for 6 months, and even from the ink composition left for 12 months, less than one tenth of the filter surface is only covered.
C: No foreign materials are observed from the ink composition left for 6 months, but from the ink composition left for 12 months, one tenth or more of the filter surface is covered.
D: Foreign materials are observed from the ink composition left for 6 months, and less than one tenth of the filter surface is covered.
E: Foreign materials are observed from the ink composition left for 6 months, and one tenth or more of the filter surface is covered.

3.6. Evaluation Results

It was found that by the ink jet ink composition of each Example which contained the acetoacetanilide-based monoazo pigment coated with the water-insoluble polymer, 1-(2-hydroxyethyl)-2-pyrrolidone, and water, a preferable result was obtained in the ink flow test, and the generation of the foreign materials was suppressed. In addition, it was also found that by the ink set of each Example which included the ink jet ink composition containing the acetoacetanilide-based monoazo pigment coated with the water-insoluble polymer, 1-(2-hydroxyethyl)-2-pyrrolidone, and water, the magenta ink composition containing the magenta pigment coated with the water-insoluble polymer, and the cyan ink composition containing the cyan pigment coated with the water-insoluble polymer, a preferable result was obtained in the ink flow test, and the generation of the foreign materials was suppressed.

In addition, from the result of the ink flow test, it was found that in order to suppress the generation of the foreign materials of the acetoacetanilide-based monoazo pigment, HEP was effectively contained, and as the total HEP amount of the individual ink compositions was increased, the generation of the foreign materials could be more preferably suppressed. From the result described above, it was found that in the ink set, HEP is more preferably contained also in the magenta ink composition, the cyan ink composition, and the black ink composition.

The above embodiments and the modified examples are described by way of example, and the present disclosure is not limited thereto. For example, the embodiments and the modified examples may be appropriately used in combination.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions are obtained.

An ink jet ink composition comprises: an acetoacetanilide-based monoazo pigment coated with a water-insoluble polymer; 1-(2-hydroxyethyl)-2-pyrrolidone; and water.

According to this ink jet ink composition, since the acetoacetanilide-based monoazo pigment is coated with the water-insoluble polymer, elution of a causative substance to generate foreign materials is suppressed, and in addition, since 1-(2-hydroxyethyl)-2-pyrrolidone is contained, the causative substance is suppressed from being formed into the foreign materials. Accordingly, even if the foreign materials are liable to be generated by a long term storage or the like, the ink jet ink composition can suppress the generation of the foreign materials. In addition, according to this ink jet ink composition, since the acetoacetanilide-based monoazo pigment is used, an image having a preferable color development property can be formed. Furthermore, according to this ink jet ink composition, since the acetoacetanilide-based monoazo pigment is coated with the water-insoluble polymer, an image having a preferable glossiness can be formed.

In the ink jet ink composition described above, the acetoacetanilide-based monoazo pigment may include C.I. Pigment Yellow 1 or C.I. Pigment Yellow 74.

According to this ink jet ink composition, even if a colorant which is liable to generate foreign materials is used, the generation of the foreign materials can be suppressed. In addition, according to this ink jet ink composition, an image having a more preferable color development property can be formed.

The ink jet ink composition described above may further comprise a moisturizing agent.

According to this ink jet ink composition, moisture can be suppressed from being evaporated, and hence for example, the storage stability can be made more preferable.

The ink jet ink composition described above may further comprise a plasticizer.

According to this ink jet ink composition, since the water-insoluble polymer can be plasticized, a film forming property of the water-insoluble polymer adhered to a recording medium can be enhanced. Accordingly, an image having a more preferable glossiness can be formed.

An ink set comprises: one of the ink jet ink compositions described above; a magenta ink composition containing a magenta pigment coated with a water-insoluble polymer; and a cyan ink composition containing a cyan pigment coated with a water-insoluble polymer.

According to this ink set, even if foreign materials are liable to be generated by a long term storage or the like, the generation of the foreign materials can be suppressed at least in the ink jet ink composition.

The ink set described above may further comprise a black ink composition containing a self-dispersible pigment.

According to this ink set, since the pigment has a self-dispersible property, a solid content concentration of the pigment can be increased, and hence, a black color development property can be enhanced.

In the ink set described above, the black ink composition may contain a (meth)acrylic resin having a glass transition temperature of 20° C. or less.

According to this ink set, since the (meth)acrylic resin has a preferable flexibility, and when the black ink composition is adhered to a recording medium, since a film formation thereof can be more easily performed, an image having a more preferable fixing property can be formed.

In the ink set described above, the ink jet ink composition and at least one of the ink compositions other than the ink jet ink composition described above, each of which is included in the ink set, may contain (1-(2-hydroxyethyl)-2-pyrrolidone.

According to this ink set, since 1-(2-hydroxyethyl)-2-pyrrolidone is contained in the ink composition other than the ink jet ink composition, in a waste liquid discharge by flushing or the like, the generation of the foreign materials can be further suppressed.

What is claimed is:

1. An ink jet ink composition comprising:
   an acetoacetanilide-based monoazo pigment coated with a water-insoluble polymer;
   1-(2-hydroxyethyl)-2-pyrrolidone; and
   water.

2. The ink jet ink composition according to claim 1, wherein the acetoacetanilide-based monoazo pigment includes C.I. Pigment Yellow 1 or C.I. Pigment Yellow 74.

3. The ink jet ink composition according to claim 1, further comprising a moisturizing agent.

4. The ink jet ink composition according to claim 1, further comprising a plasticizer.

5. An ink set comprising:
   the ink jet ink composition according to claim 1;
   a magenta ink composition containing a magenta pigment coated with a water-insoluble polymer; and
   a cyan ink composition containing a cyan pigment coated with a water-insoluble polymer.

6. The ink set according to claim 5, further comprising a black ink composition containing a self-dispersible pigment.

7. The ink set according to claim 6, wherein the black ink composition contains a (meth)acrylic resin having a glass transition temperature of 20° C. or less.

8. The ink set according to claim 6, wherein the ink jet ink composition and at least one of the ink compositions other than the ink jet ink composition, each of which is included in the ink set, contain 1-(2-hydroxyethyl)-2-pyrrolidone.

* * * * *